United States Patent
Vorarath

(10) Patent No.: US 11,919,788 B2
(45) Date of Patent: Mar. 5, 2024

(54) METHODS OF REMOVING INORGANIC FLUORIDE FROM COMPOSITIONS CONTAINING FLUORINATED ORGANIC COMPOUNDS

(71) Applicant: 3M INNOVATIVE PROPERTIES COMPANY, St. Paul, MN (US)

(72) Inventor: Phanasouk Vorarath, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 23 days.

(21) Appl. No.: 17/810,942

(22) Filed: Jul. 6, 2022

(65) Prior Publication Data

US 2023/0029807 A1 Feb. 2, 2023

Related U.S. Application Data

(60) Provisional application No. 63/223,438, filed on Jul. 19, 2021.

(51) Int. Cl.
| | |
|---|---|
| *C02F 1/68* | (2023.01) |
| *C02F 1/02* | (2023.01) |
| *C02F 1/20* | (2023.01) |
| *C02F 1/54* | (2023.01) |
| *C02F 101/14* | (2006.01) |

(52) U.S. Cl.
CPC ............... *C02F 1/68* (2013.01); *C02F 1/02* (2013.01); *C02F 1/20* (2013.01); *C02F 1/545* (2013.01); *C02F 2101/14* (2013.01); *C02F 2209/02* (2013.01); *C02F 2301/063* (2013.01)

(58) Field of Classification Search
None
See application file for complete search history.

(56) References Cited

U.S. PATENT DOCUMENTS

| | | | |
|---|---|---|---|
| 5,122,356 A  * | 6/1992 | Kawamura | C01B 7/0706 |
| | | | 556/466 |
| 9,308,519 B2 * | 4/2016 | Adachi | C08B 37/0012 |
| 10,562,800 B2 * | 2/2020 | Fukita | B01F 25/211 |
| 2020/0300824 A1 | 9/2020 | Vorarath | |

FOREIGN PATENT DOCUMENTS

| | | | | |
|---|---|---|---|---|
| CN | 106927423 A | 7/2017 | | |
| JP | S 5861883 A  * | 4/1993 | ............... | C02F 1/28 |
| WO | 2015152258 A1 | 10/2015 | | |
| WO | 2017172390 A1 | 10/2017 | | |
| WO | 2021028799 A1 | 2/2021 | | |

OTHER PUBLICATIONS

Machine translation of JPS 5861883A, pp. 1-2, 1993 (Year: 1993).*
Hattab, "Diffusion of fluorides in human dental enamel in vitro", Archives of Oral Biology, 1986, vol. 31, No. 12, pp. 811-814.
Martinez-Mier, "Evaluation of the direct and diffusion methods for the determination of fluoride content in table salt", Community Dent Health, Dec. 2009, vol. 26, No. 4, pp. 204-210.
Stuart, "A simple diffusion method for the determination of fluoride", Dec. 1970, vol. 95, No. 1137, pp. 1032-1038.

* cited by examiner

*Primary Examiner* — Clare M Perrin
(74) *Attorney, Agent, or Firm* — Thomas M. Spielbauer

(57) ABSTRACT

Methods of treating a water sample containing both free fluoride and fluorinated organic compounds are described. The methods are effective at removing high amounts of the free fluoride while retaining high amounts of the fluorinated organic compounds. The methods include combining the water sample with a hexaalkyldisiloxane, a strong acid and a compatibilizing solvent; reacting the free fluoride with the disiloxane; and removing the fluorinated reaction product.

12 Claims, No Drawings

METHODS OF REMOVING INORGANIC FLUORIDE FROM COMPOSITIONS CONTAINING FLUORINATED ORGANIC COMPOUNDS

CROSS-REFERENCE TO RELATED APPLICATIONS

This application claims the benefit of and priority to U.S. Application No. 63/223,438, filed 19 Jul. 2021, which is incorporated herein by reference.

FIELD

The present disclosure relates to methods of treating a composition containing both free inorganic fluoride (free fluoride) and fluorinated organic compounds. The methods are highly effective at removing the free fluoride, while retaining high amounts of the fluorinated organic compounds. The treated samples may then be analyzed to determine the total amount of organic fluoride (TOF), without interference from the free fluoride.

SUMMARY

Briefly, in one aspect, the present disclosure provides methods of treating a water sample containing free fluoride and fluorinated organic compounds. The methods comprise combining the water sample with a hexaalkyldisiloxane, a strong acid, and a compatibilizing solvent to form a single phase solution; reacting the free fluoride with the hexaalkyldisiloxane to form a flurorotrialkylsilane; and removing the flurorotrialkylsilane to form a purified composition.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

There is an on-going desire to quantitatively measure the total amount of fluorinated organic compounds in water. However, many water sources also contain free fluoride arising from the addition of inorganic fluoride sources such as sodium fluoride. For example, in many locations, public drinking water is fluoridated to reduce tooth decay. Although the level of such fluoridation varies, recommended values for free fluoride have ranged from 0.5 to 2 milligrams per liter (i.e., 0.5 to 2 ppm). Amounts as high as 4 ppm of free fluoride have been found.

In contrast to these high levels of free fluoride, there is a desire to detect and measure the amounts of fluorinated organic compounds at the parts per billion level, e.g., at levels of 10 ppb or even lower. Methods of detecting and quantifying the total amount of fluorinated organic compounds at such low levels include the use of oxy-pyrohydrolysis systems such as those described in United States Patent Publication No. US2020/0300824 A1 (Oxy-Pyrohydrolysis System and Method for Total Halogen Analysis) and PCT Publication WO 2021/028799 A1 (Oxy-Pyrohydrolysis Reactors With Protected Inserts).

Despite the advantages of these systems, they provide measurements of the total fluorine content independent of the source of the fluorine. Therefore, to determine the total fluorine content arising only from fluorinated organic compounds, there is a need to remove the free fluoride. Specifically, in order to accurately measure the total amount of fluorine associated with fluorinated organic compounds in water, there is a need to remove as much of the free fluoride as possible, while retaining as much of the fluorinated organic compounds as possible. Such purified water samples can then be processed in e.g., oxy-pyrolysis systems to quantify the total amount of organically-derived fluorine.

Generally, the methods of the presence disclosure include treating a water sample containing both free fluoride and fluorinated organic compounds with a hexaalkyldisiloxane in the presence of a strong acid and a compatibilizing solvent. Such a method is believed to result in one or both of the following reaction mechanisms between the free fluoride and the hexaalkyldisiloxane. In the following mechanisms, hexamethyldisloxane (HMDS) is used for illustration.

Mechanism I:

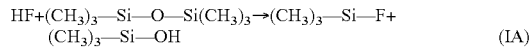

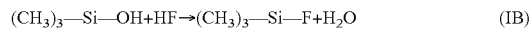

Mechanism II:

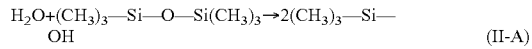

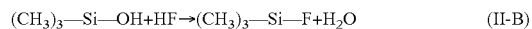

Note that, with both mechanisms, one mole of the alkyl disiloxane reacts with two moles of HF.

As used herein, strong acids have a pKa of less than 2, preferably less than 1. Exemplary strong acids include hydrochloric acid, sulfuric acid and nitric acid. In some embodiments, nitric acid is preferred.

As used herein, a compatibilizing solvent is one that is miscible with water and can dissolve the disiloxane or its corresponding silanols (see, e.g., Reaction IIA, above). Exemplary compatibilizing solvents include alcohols and ketones such as acetone. In some embodiments, acetone is a preferred compatibilizing solvent.

In the present methods, the water sample containing both free fluoride and fluorinated organic compounds is combined with the hexaalkyldisiloxane, the strong acid and the compatibilizing solvent to form a single phase solution. The free fluoride is reacted with the disiloxane to form a flurorotrialkylsilane. For example, if the hexaalkyldisiloxane is hexamethyldisiloxane, fluorotrimethylsilane will be formed. As this compound has a low boiling point (16 to 18° C.), it can easily be removed by evaporation. In some embodiments, a vacuum or an air stream (e.g., a forced air stream) may be used to assist in the removal of the flurorotrialkylsilane. In some embodiments, the process may be conducted at room temperature or higher. Generally, it is not necessary to use temperature in excess of 85° C.

In some embodiments the solution can be subjected to high shear during the reactions to ensure adequate mixing and improve the reaction and removal rates.

In some embodiments, it is desirable to remove other anions that may be present in the water, e.g., chloride, sulfate, and metals prior to treating the water with the methods of the present disclosure. Any known methods of pre-treatment may be used.

Examples-Removal of Free Fluoride

Tap water and tap water spiked with additional fluoride were treated to determine the efficiency of free fluoride removal. The samples were pre-filtered using a Dionex™, OnGuard™ II BA/Ag/H cartridge to remove ions such as sulfates, chloride, calcium and metals.

The filtered water was then processed "as is" or after it was spiked with sodium fluoride to increase the amount of free fluoride in the sample, as summarized in Table 1.

Each water sample (10 grams) was combined with nitric acid (0.01 grams), acetone (7 grams) and hexamethyldisiloxane (0.75 grams) in a 40-mL glass vial. The vial was placed on a GENEVAC Evaporation System and, while being rotated at 2500 rpm, the sample was heated to 80° C. over 30 minutes, then held at 80° C. for 20 minutes. The processed samples were then analyzed using ion chromatography. The results are summarized in Table 1.

TABLE 1

Efficiency of free fluoride removal.

| | | Fluoride content (ppm) | | |
|---|---|---|---|---|
| Sample | Description | Initial | Final | % reduction |
| A1 | Tap water (control) | 0.65 | ≤0.01 | ≥99% |
| A2 | Tap Water Spiked 2 ppm F | 2.65 | ≤0.01 | ≥99% |
| A3 | Tap Water Spiked 10 ppm F | 10.65 | ≤0.01 | ≥99% |
| A4 | Tap Water Spiked 56 ppm F | 56.65 | ≤0.01 | ≥99% |

As shown, the methods of the present disclosure are highly effective at removing free fluoride. However, it is also necessary to retain the fluorinated organic compounds.

Examples-Removal of Free Fluoride, while Retaining Fluorinated Organic Compounds Tap water and tap water spiked with fluorinated organic compounds were treated to determine the efficiency of free fluoride removal. The samples were pre-filtered using a Dionex™, OnGuard™ II BA/Ag/H cartridge to remove ions such as sulfates, chloride, calcium and metals. The filtered water was then processed "as is" or spiked with a mixture of low molecular weight fluorinated organic compounds to introduce a desired amount of fluorinated organic compounds (total organic fluoride, "TOF"), as summarized in Table 2. The mixture contained trifluoroacetic acid (TFA), perfluoropropionic acid (PFPA), 2,3,3,3-tetrafluoropropionic acid (2333 PFPA), perfluorobutanoic acid (PFBA) and perfluorobutanesulfonic acid (PFBS).

Each water sample (10 grams) was combined with nitric acid (0.005 grams), acetone (3.5 grams) and hexamethyldisiloxane (0.375 grams) in a 40-mL glass vial. The vial was placed on a GENEVAC Evaporation System and, while being rotated at 2500 rpm, the sample was heated to 80° C. over 30 minutes, then held at 80° C. for 20 minutes. The processed samples were then analyzed. The amount of free fluoride was measured using ion chromatography and the total fluorine was measured using the oxy-pyrolysis method described in United States Patent Publication No. US2020/0300824 A1. The amount of Total Organic Fluoride (TOF) was determined by subtracting the measured free fluoride from the measured total fluorine. The results are summarized in Table 2.

TABLE 2

Efficiency of free fluoride removal and retention of Total Organic Fluoride (TOF).

| | | Free Fluoride content (ppb) | | Total Fluorine (ppb) | TOF (ppb) | TOF retention |
|---|---|---|---|---|---|---|
| Sample | Description | Initial | Final | Final | Final | % |
| B1 | Tap water (control) | 700 | 1.8 | 3.3 | 1.5 | N/A |
| B2 | Spiked with 10 ppb TOF | 700 | 1.7 | 11.0 | 9.3 | 93% |
| B3 | Spiked with 50 ppb TOF | 700 | 1.8 | 51.3 | 49.5 | 99% |

As shown, using the methods of the present disclosure, free fluoride is effectively removed while retaining very high amounts of the fluorinated organic compounds.

Additional samples were prepared using a control sample containing free fluoride and various amounts of total organic fluoride. Samples were spiked with the mixture of fluorinated organic compounds and treated using the same procedures as described above. After treatment, the amount of TOF was measured using the oxy-pyrolysis method described in United States Patent Publication No. US2020/0300824 A1 ("O—P") and liquid chromatography mass spectroscopy ("LCMS"). The results are summarized in Table 3.

TABLE 3

Retention of Total Organic Fluoride (TOF).

| | | Free Fluoride content | | TOF "O-P method" | | TOF "LCMS method" | |
|---|---|---|---|---|---|---|---|
| Sample | Description | Initial (ppb) | Final (ppb) | Final (ppb) | % retained | Final (ppb) | % retained |
| C1 | Base sample | 2070 | 6.8 | 173 | N/A | 166 | N/A |
| C2 | Spiked with 50 ppb TOF | 2070 | 6.8 | 225 | 101% | 211 | 96% |
| C3 | Spiked with 100 ppb TOF | 2070 | 6.8 | 271 | 99% | 257 | 94% |
| C4 | Spiked with 200 ppb TOF | 2070 | 6.8 | 370 | 99% | 348 | 92% |
| C5 | Spiked with 300 ppb TOF | 2070 | 6.8 | 481 | 102% | 451 | 96% |
| C6 | Spiked with 400 ppb TOF | 2070 | 6.8 | 594 | 104% | 552 | 97% |

Again, using the methods of the present disclosure, substantially all of the free fluoride was removed from the water samples, while retaining high amounts of fluorinated organic compounds. Thus, using the methods of the present disclosure, water samples containing free fluoride, for example public water sources, can be treated to remove the free fluoride. The treated samples can then be analyzed using a variety of approaches to quantify the amount of fluorinated organic compounds present in the water samples, without interference from the free fluoride.

Various modifications and alterations of this invention will become apparent to those skilled in the art without departing from the scope and spirit of this invention.

What is claimed is:

1. A method of treating a water sample containing free fluoride and fluorinated organic compounds, the method comprising combining the water sample with a hexaalkyldisiloxane, a strong acid, and a compatibilizing solvent to form a single phase solution; reacting the free fluoride with the hexaalkyldisiloxane to form a flurorotrialkylsilane, and removing the flurorotrialkylsilane to form a purified composition.

2. The method of claim 1, wherein the hexaalkyldisiloxane is hexamethyldisiloxane.

3. The method of claim 1, wherein the strong acid in nitric acid.

4. The method of claim 1, wherein the compatibilizing solvent is acetone.

5. The method of claim 1, wherein removing the flurorotrialkylsilane comprises applying a vacuum.

6. The method of claim 1, further comprising heating the solution.

7. The method of claim 1, wherein the purified composition comprises no greater than 1% by mass of the free fluoride contained in the water sample.

8. The method according to claim 7, wherein the purified composition comprises no greater than 2 ppb of free fluoride.

9. The method according to any one of the preceding claims, wherein the purified composition comprises greater than 95% by weight of the fluorinated organic compounds contained in the water sample.

10. The method of claim 1, further comprising treating the water sample to remove sulfates and chlorides prior to combining the water sample with one or more of the hexaalkyldisiloxane, the strong acid, and the compatibilizing solvent.

11. The method of claim 10, wherein treating the water sample to remove sulfates and chlorides occurs prior to combining the water sample with the hexaalkyldisiloxane, the strong acid, and the compatibilizing solvent.

12. The method of claim 1, further comprising measuring the total organic fluoride content in the purified composition.

* * * * *